(12) United States Patent
Ito et al.

(10) Patent No.: US 10,367,406 B2
(45) Date of Patent: Jul. 30, 2019

(54) SUPERCONDUCTING ROTATING MACHINE

(71) Applicant: KAWASAKI JUKOGYO KABUSHIKI KAISHA, Kobe-shi, Hyogo (JP)

(72) Inventors: Takafumi Ito, Kakogawa (JP); Hayato Iwasaki, Kobe (JP); Yosuke Tsumura, Kobe (JP); Yoshichika Sato, Akashi (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 293 days.

(21) Appl. No.: 15/328,729

(22) PCT Filed: Aug. 6, 2015

(86) PCT No.: PCT/JP2015/072355
§ 371 (c)(1),
(2) Date: Jan. 24, 2017

(87) PCT Pub. No.: WO2016/021686
PCT Pub. Date: Feb. 11, 2016

(65) Prior Publication Data
US 2017/0214308 A1 Jul. 27, 2017

(30) Foreign Application Priority Data
Aug. 7, 2014 (JP) .................. 2014-161735

(51) Int. Cl.
*H02K 55/00* (2006.01)
*B63H 21/17* (2006.01)
(Continued)

(52) U.S. Cl.
CPC ............. *H02K 55/00* (2013.01); *B63H 21/17* (2013.01); *F16C 17/04* (2013.01); *H02K 1/04* (2013.01);
(Continued)

(58) Field of Classification Search
CPC .......... H02K 55/00; H02K 55/04; H02K 1/04; H02K 1/22; H02K 9/005; H02K 5/167
See application file for complete search history.

(56) References Cited

U.S. PATENT DOCUMENTS

2006/0170297 A1\* 8/2006 Jyono ................... F16C 17/107
310/90
2015/0270769 A1\* 9/2015 Sato ........................ H02K 55/04
505/163

FOREIGN PATENT DOCUMENTS

JP S57-20168 A 2/1982
JP S57-149690 U 9/1982
(Continued)

OTHER PUBLICATIONS

Kato, Koji.,"Wear in relation to friction—a review." Wear, vol. 241, No. 2, pp. 151-157, Jul. 1, 2000.
(Continued)

*Primary Examiner* — Dang D Le
(74) *Attorney, Agent, or Firm* — Oliff PLC

(57) ABSTRACT

A sliding surface located to one side in the axial direction relative to the axially central position of a rotary shaft is supported by the slide surface of a supply shaft in a slidable manner in the axial direction, the slide surface being the surface on which sliding occurs. The portion located to the other side in the axial direction side relative to the axially central position of the rotary shaft is fixed to an output shaft. The sliding surface is positioned on the surface of a hard coating, and the hard coating is positioned so as to cover a part of a substrate made of a GFRP. The slide surface is positioned on the surface of a hard coating, and the hard coating is positioned so as to cover a part of a substrate made of a GFRP.

4 Claims, 9 Drawing Sheets

(51) Int. Cl.
    *F16C 17/04*     (2006.01)
    *H02K 1/04*     (2006.01)
    *H02K 1/22*     (2006.01)
    *H02K 5/167*     (2006.01)
    *H02K 9/00*     (2006.01)
    *H02K 55/04*     (2006.01)
    *H02K 7/00*     (2006.01)

(52) U.S. Cl.
    CPC ............... *H02K 1/22* (2013.01); *H02K 5/167* (2013.01); *H02K 9/005* (2013.01); *H02K 55/04* (2013.01); *B63B 2755/00* (2013.01); *B63H 2021/173* (2013.01); *F16C 2380/26* (2013.01); *H02K 7/003* (2013.01); *H02K 2213/09* (2013.01)

(56) References Cited

FOREIGN PATENT DOCUMENTS

| | | |
|---|---|---|
| JP | S61-137692 A | 6/1986 |
| JP | 2014-082859 A | 5/2014 |

OTHER PUBLICATIONS

Oct. 20, 2015 International Search Report issued in International Patent Application No. PCT/JP2015/072355.

\* cited by examiner

SUPERCONDUCTING ROTATING MACHINE

TECHNICAL FIELD

The present invention relates to a superconducting rotating machine utilizing superconductivity and having a rotating shaft and relates to, for example, a superconducting motor and a superconducting generator.

BACKGROUND ART

Conventional superconducting rotating machines include, for example, a superconducting rotating machine described in Japanese Unexamined Utility Model Application Publication No. 57-149690 (Patent Document 1). This superconducting rotating machine has a torque tube, a drive side shaft, an anti-drive side shaft, a cylindrical warm damper, a cylindrical slide ring, and a superconducting coil, and a portion of the torque tube defines a helium-filled container. The superconducting coil is held within the warm damper and on an outer circumferential surface of a helium-filled container defining part of the torque tube.

The drive side shaft is located on one axial end side of the helium-filled container defining part, while the anti-drive side shaft is located on the other axial end portion side of the helium-filled container defining part. The drive side shaft and the anti-drive side shaft are mechanically coupled through the warm damper.

The torque tube is fixed to the anti-drive side shaft and coupled through a spoke to the slide ring. The spoke supports the slide ring. The drive side shaft has a cylindrical part at an end portion on the superconducting coil side, and a cylindrical supporting ring is fitted into an inner circumferential surface of the cylindrical part. An outer circumferential surface of the slide ring is axially slidably fitted into an inner circumferential surface of the supporting ring.

The spoke is made of titanium, which has low thermal conductivity among metals, or titanium alloy, while the material of the supporting ring is made of graphite-containing Teflon (registered trademark) having low thermal conductivity and excellent lubricity. Therefore, sliding surfaces of the supporting ring and the slide ring are made of graphite-containing Teflon (registered trademark). This superconducting rotating machine has the slide ring made slidable against the supporting ring so that an axial thermal strain can be absorbed by a slide therebetween.

PATENT DOCUMENT

Patent Document 1: Japanese Unexamined Utility Model Application Publication No. 57-149690 (FIG. 2)

SUMMARY OF THE INVENTION

Problem to be Solved by the Invention

The present inventors found the following problem regarding the conventional superconducting rotating machines described above. In particular, a large superconducting rotating machine such as a three-MW class superconducting motor can preferably be used in a propulsion system etc. of a work vessel (offshore vessel), a liquefied natural gas (LNG) tanker, etc. Such a superconducting rotating machine must have a superconducting coil kept at an extremely low temperature although the superconducting rotating machine is large-sized. Therefore, it is found that since a member supporting a sliding part occupies a large portion of a heat input path, a member made of titanium or titanium alloy results in a large heat input amount and an insufficient thermal insulating property.

Additionally, the superconducting rotating machine is huge and therefore becomes excessive in terms of thermal contraction absorbed by a sliding part and weight of a rotor core (a portion holding the superconducting coil and generating a rotating force). Thus, it is found that the sliding part made of graphite-containing Teflon (registered trademark) results in an insufficient wear resistance.

Therefore, a problem to be solved by the present invention is to provide a superconducting rotating machine capable of improving the thermal insulating property and improving the wear resistance of a sliding part in spite of having the sliding part for enabling absorption of thermal contraction.

Means for Solving Problem

A superconducting rotating machine of the present invention is characterized by comprising:

a rotating shaft having an annular sliding surface on one side in an axial direction;

a torque transmitting part fixed to the other side in the axial direction of the rotating shaft;

a rotating shaft supporting part having an annular slid surface slidable in the axial direction on the sliding surface and supporting the rotating shaft in a state of being relatively movable in the axial direction with respect to the rotating shaft, and a superconducting coil held by the rotating shaft and cooled by a coolant supplied from one end side or the other end side in the axial direction of the rotating shaft, at least one of the sliding surface and the slid surface being present on a surface of a hard coating film located to partially cover a heat input suppressing part made of a fiber-reinforced plastic, the hard coating film being harder than the heat input suppressing part.

Effect of the Invention

The present invention can achieve the superconducting rotating machine having a sliding part for enabling absorption of thermal contraction as well as capable of improving the thermal insulating property and improving the wear resistance of the sliding part.

EMBODIMENTS FOR CARRYING OUT THE INVENTION

Figure 1:
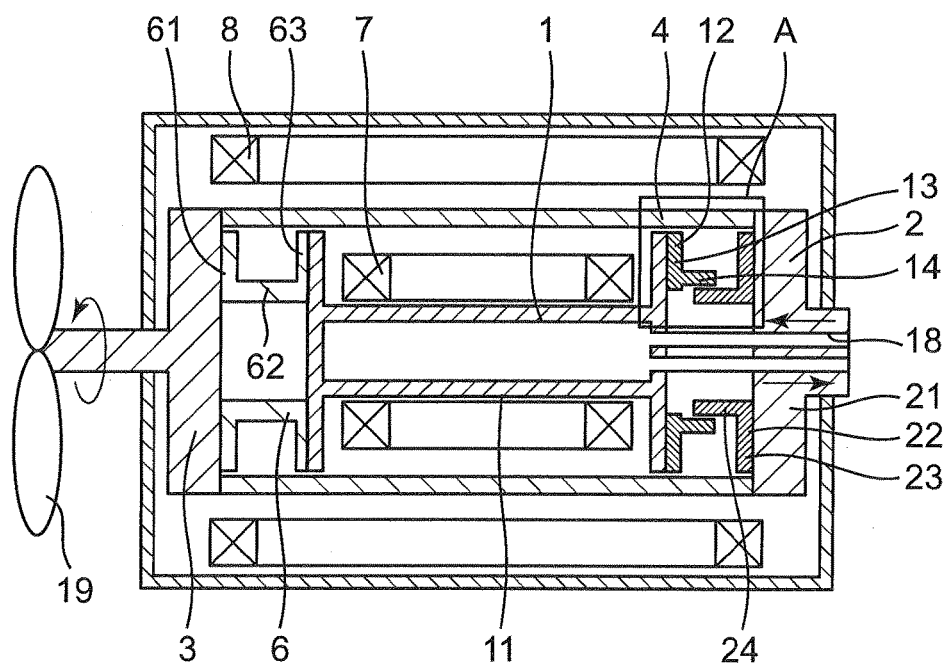
FIG. 1 is a schematic for generally explaining a configuration of a superconducting motor that is an embodiment of a superconducting rotating machine of the present invention.

A superconducting rotating machine according to an aspect of the present invention is characterized by comprising a rotating shaft having an annular sliding surface on one side in an axial direction, a torque transmitting part fixed to the other side in the axial direction of the rotating shaft, a rotating shaft supporting part having an annular slid surface slidable in the axial direction on the sliding surface and supporting the rotating shaft in a state of being relatively movable in the axial direction with respect to the rotating shaft, and a superconducting coil held by the rotating shaft and cooled by a coolant supplied from one end side or the other end side in the axial direction of the rotating shaft, at least one of the sliding surface and the slid surface being present on a surface of a hard coating film located to partially cover a heat input suppressing part made of a fiber-reinforced plastic, the hard coating film being harder than the heat input suppressing part.

The phrase "having an annular sliding surface on one side in an axial direction" means that the sliding surface is present in a region on one side in the axial direction relative to the center position in the axial direction of the rotating shaft. The phrase "fixed to the other side in the axial direction of the rotating shaft" means that the torque transmitting part is fixed to the rotating shaft at a portion located on the other side in the axial direction relative to the center position in the axial direction of the rotating shaft.

The phrase "fixed to the other side in the axial direction of the rotating shaft" includes the case that the torque transmitting part is directly fixed to the rotating shaft and the case that the torque transmitting part is indirectly fixed through a member to the rotating shaft.

The hard coating film may be in direct contact with the heat input suppressing part, or a foundation film different from the hard coating film may be present between the heat input suppressing part and the hard coating film.

Although the fiber-reinforced plastic (FRP) includes glass fiber-reinforced plastic (GFRP), the fiber-reinforced plastic obviously includes fiber-reinforced plastic other than glass fiber-reinforced plastic.

According to such a configuration, since the hard coating film having at least one of the sliding surface and the slid surface is located to cover the heat input suppressing part made of fiber-reinforced plastic, a large portion of a heat input path of a sliding structure can be made of fiber-reinforced plastic. Therefore, as compared to the conventional case of a supporting element made of metal (e.g., nickel alloy), the thermal conductivity can drastically be reduced by a factor of about $1/20$. Therefore, even in the case of a huge superconducting rotating machine, the superconducting coil can certainly be thermally-insulated from the outside and a periphery of the superconducting coil can certainly be maintained at an extremely low temperature.

At least one of the sliding surface and the slid surface is present on the hard coating film having a hardness higher than fiber-reinforced plastic. Therefore, even if the sliding surface slides against the slid surface while an excessive frictional force is generated based on larger thermal contraction or rotor core's own weight, at least one of the sliding surface and the slid surface is hardly worn.

Although fiber-reinforced plastic (hereinafter referred to as FRP) has an excellent thermal insulating property, wear of a resin portion and exposure of fibers were observed in a wear test between FRP and FRP conducted by the present inventors. In this aspect, while FRP is employed as the heat input suppressing part, at least one of the sliding surface and the slid surface partially covering the heat input suppressing part is made of the hard coating film, so that FRP and FRP do not slide on each other. Therefore, as compared to the conventional case, while the heat input amount of the sliding structure can drastically be reduced and the thermal insulating performance can drastically be improved, the sliding part can be made excellent in wear resistance.

In another aspect of the present invention, an end surface on at least one side in the axial direction of the hard coating film is smoothly connected to a surface of the heat input suppressing part.

In this aspect, the end surface of the hard coating film and the surface of the heat input suppressing part may directly be connected, or may indirectly be connected through a foundation film arranged between the hard coating film and the surface of the heat input suppressing part.

The phrase "smoothly connected" is satisfied when the end surface of the hard coating film is continuously connected from the end portion on the heat input suppressing part side to the end portion on the hard coating film side of the heat input suppressing part without the presence of a corner portion in a region from the end portion on the heat input suppressing part side of the end surface of the hard coating film (including this end portion) to the end portion on the hard coating film side of the heat input suppressing part (including this end portion).

The present inventors obtained the following knowledge from studies. For example, if the hard coating film is formed by thermal spraying, FRP cannot be increased in temperature because of the heat-resisting property and, therefore, the film is formed by causing melted metal to collide with FRP at normal temperature. As a result, the melted metal shrinks when adhering and hardening, and a force is applied in the direction of turning up of the hard coating film. When a residual stress is generated in a hard coating film in this way and the hard coating film has a non-smooth portion due to a corner portion in an end portion, the hard coating film easily peels due to stress concentration.

According to the aspect, since an end surface on at least one side in the axial direction of the hard coating film is smoothly connected to a surface of the heat input suppressing part, the force in the direction of turning up can be relaxed when the hard coating film shrinks. Therefore, the end portion of the hard coating film can be restrained from peeling.

If a corner portion exists in the region from the end portion on the heat input suppressing part side of the end surface of the hard coating film to the end portion on the hard coating film side of the heat input suppressing part, the stress is concentrated and the peeling easily occurs in a periphery of the corner portion.

In another aspect, the surface of the heat input suppressing part has a recess, the end surface on the one side of the hard coating film is smoothly connected to a side surface in the axial direction of the recess.

The present inventors found that with regard to a connection region between the hard coating film and the heat input suppressing part, when the hard coating film side relative to a boundary between the hard coating film and the heat input suppressing part is smoothly and more linearly connected to the heat input suppressing part side relative to the boundary, the stress hardly acts on the connection region and hardly causes the peeling as compared to the connection with the direction significantly changed in the connection region.

The recess of the side surface forms a slope relative to an extension direction of a surface portion leading to an upper end of the recess. Therefore, according to this embodiment, the end surface of the hard coating film is connected to the side surface in the axial direction of the recess and, therefore, the end surface of the hard coating film and the surface of the heat input suppressing part can more linearly be connected. Thus, the possibility of occurrence of the peeling can further be suppressed.

In another aspect, the hard coating film is formed by thermal spraying.

According to the aspect, since the hard coating film is formed by thermal spraying, the film thickness of the hard coating film and the dimensions of the formation region of the hard coating film can more precisely be managed. Therefore, the wear resistance and the thermal insulating property of the hard coating film can be made more excellent.

In another aspect, the rotating shaft has a body part having a circumferential surface and a projecting part projecting from the body part such that the sliding surface is present on the projecting part;

the superconducting rotating machine further comprises a one-end side shaft that is located on one end side in the axial direction of the rotating shaft, that has a supporting part with the slid surface, and that rotates in synchronization with the rotating shaft in a state of being relatively movable with respect to the rotating shaft;

the superconducting coil is held on the circumferential surface of the rotating shaft;

the sliding surface and the slid surface are each present on the surface of the hard coating film;

the heat input suppressing part partially covered by the hard coating film having the sliding surface is made of glass fiber-reinforced plastic; and the heat input suppressing part partially covered by the hard coating film having the slid surface is also made of glass fiber-reinforced plastic.

The one-end side shaft may have a portion radially overlapping with one end portion of the rotating shaft, or may be located at a distance in the axial direction from the rotating shaft without radially overlapping with the rotating shaft. In short, the phrase "located on one end side in the axial direction of the rotating shaft" is satisfied as long as the one-end side shaft has a portion located on the one end side relative to the center position in the axial direction of the rotating shaft.

According to the aspect, since the heat input suppressing part occupying a large portion of the heat input path of the sliding structure is made of glass fiber-reinforced plastic having a high heat input suppression effect, the thermal conductivity can further be reduced. Therefore, even in the case of a huge superconducting rotating machine, the superconducting coil can more certainly be thermally-insulated from the outside and a periphery of the superconducting coil can more certainly be maintained at an extremely low temperature.

According to the aspect, since the sliding surface of the projecting part and the slid surface of the supporting part are respectively included in the hard coating films having the hardness higher than the glass fiber-reinforced plastic, even if the projecting part slides against the supporting part while an excessive frictional force is generated based on larger thermal contraction or rotor core's own weight, the projecting part and the supporting part are hardly worn.

In the aspect, since the glass fiber-reinforced plastic (hereinafter referred to as GFRP) is employed for the heat input suppressing part while the sliding surface is made up of the hard coating film, the GFRP does not slide. Therefore, as compared to the conventional case, the heat input amount of the sliding structure can drastically be reduced and the thermal insulating performance can drastically be improved while the wear resistance of the sliding part can be made excellent.

An embodiment of the present invention will now be described with reference to the drawings. The present invention is not limited to this embodiment.

FIG. 1 is a schematic for generally explaining a configuration of a superconducting motor that is an embodiment of a superconducting rotating machine of the present invention. It is noted that FIG. 1 is a schematic and is reduced in complexity and simplified as compared to an actual shape etc.

As shown in FIG. 1, this superconducting motor includes a rotating shaft 1, a supply shaft 2 acting as a one-end side shaft, an output shaft 3 acting as a torque transmitting part, a warm damper 4, a torque tube 6, a superconducting coil 7, and a normal coil 8.

The rotating shaft 1 has a body part 11 and an annular and integral projecting part 12. The body part 11 is tube-shaped and has a cylindrical internal space. On the other hand, the projecting part 12 has a disk-shaped fixing part 13 and a cylindrical part 14. The fixing part 13 is fixed to an end surface on one side in the axial direction of the body part 11 by a fastening member such as a bolt. The cylindrical part 14 is projected from the fixing part 13 on the one side in the axial direction.

The supply shaft 2 is located on one end side in the axial direction of the rotating shaft 1. The supply shaft 2 supplies a coolant such as liquid helium and low temperature helium from the one end side in the axial direction of the rotating shaft 1 toward the rotating shaft 1. Specifically, the rotating shaft 1 and the supply shaft 2 each have a cylindrical space extending along a central axis. The superconducting motor has a coolant passage 18, and the coolant passage 18 is present across the cylindrical spaces of the rotating shaft 1 and the supply shaft 2. The coolant is allowed to flow through the coolant passage 18 and is sent from the supply shaft 2 toward the rotating shaft 1, thereby cooling the rotating shaft 1.

As shown in FIG. 1, the supply shaft 2 has a body part 21 and an annular and integral supporting part 22, and the supporting part 22 has a disk-shaped fixing part 23 and an annular cylindrical part 24. The supporting part 22 constitutes a rotating shaft supporting part. The fixing part 23 is fixed to an end surface on the other side in the axial direction of the body part 21 by a fastening member such as a bolt. The cylindrical part 24 extends from the fixing part 23 on the other side in the axial direction. As shown in FIG. 1, an outer circumferential surface of the cylindrical part 24 of the supporting part 22 is fitted into an inner circumferential surface of the cylindrical part 14 of the projecting part 12 of the rotating shaft 1. The outer circumferential surface of the cylindrical part 24 of the supporting part 22 is slidable in the axial direction relative to the inner circumferential surface of the cylindrical part 14 of the projecting part 12.

The output shaft 3 is located on the other end side in the axial direction of the rotating shaft 1. The warm damper 4 is a cylindrical member. The warm damper 4 connects the supply shaft 2 and the output shaft 3. One end portion in the axial direction of the warm damper 4 is fixed to the other end portion in the axial direction of the supply shaft 2 by a fastening member such as a bolt (not shown), while the other end portion in the axial direction of the warm damper 4 is fixed to one end portion in the axial direction of the output shaft 3 by a fastening member such as a bolt (not shown). Therefore, the supply shaft 2, the output shaft 3, and the warm damper 4 are made to integrally rotate.

As shown in FIG. 1, the torque tube 6 includes an annular structure having a substantially U-shaped cross section opened radially outward. Specifically, the torque tube 6 has a first disk part 61, a cylindrical part 62, and a second disk part 63, and the cylindrical part 62 connects the first disk part 61 and the second disk part 63. The first disk part 61 is fixed to an end surface on one side in the axial direction of the output shaft 3 by a fastening member such as a bolt, while the second disk part 63 is fixed to an end surface on the other side in the axial direction of the rotating shaft 1 by a fastening member such as a bolt. Therefore, the rotating shaft 1 and the output shaft 3 are made to integrally rotate.

The superconducting coil 7 is held on a circumferential surface of the rotating shaft 1 and is cooled by the coolant sent to the inside of the rotating shaft 1. The superconducting coil 7 is cooled to about 30 K by the coolant going through the coolant passage during operation of the superconducting motor.

As described above, in the superconducting coil 7, the rotating shaft 1 and the output shaft 3 integrally rotate via the torque tube 6, and the supply shaft 2 and the output shaft 3 integrally rotate via the warm damper 4. On the other hand, the outer circumferential surface of the cylindrical part 24 of the supporting part 22 is slidable in the axial direction relative to the inner circumferential surface of the cylindrical part 14 of the projecting part 12, so that the rotating shaft 1 is slidable in the axial direction relative to the supply shaft 2. Therefore, a structure is achieved such that the output shaft 3 integrally rotate with the rotating shaft 1 in a stationary state with respect to the rotating shaft 1, while the supply shaft 2 rotates in synchronization with the rotating shaft 1 in a relatively movable state with respect to the rotating shaft 1. In this way, even in the case of a superconducting motor with the rotating shaft 1 having a large contraction amount in the axial direction, a structure is achieved such that damages etc. are not generated even if the thermal contraction and the stress attributable to the weight of the rotating shaft 1 can be absorbed and the durability between the rotating shaft 1 and the supply shaft is made lower.

As shown in FIG. 1, the normal coil 8 is located outside the warm damper 4. The normal coil 8 is disposed to face the superconducting coil 7 in the radial direction (the radial direction of the rotating shaft 1). Although not described in detail, in FIG. 1, reference numeral 19 denotes a propeller blade of a large ship such as a work vessel (offshore vessel) or a liquefied natural gas (LNG) tanker.

Figure 2:
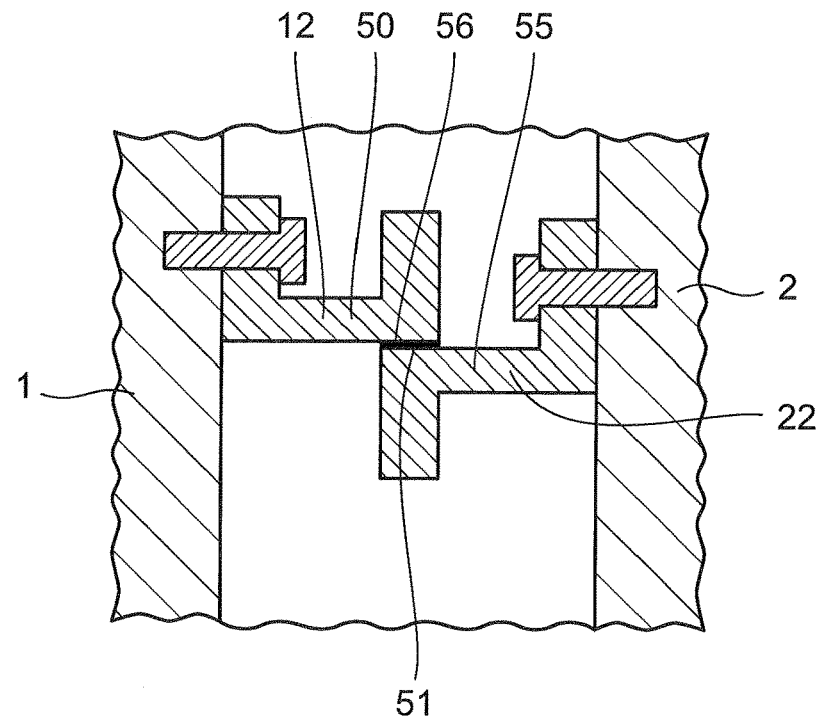
FIG. 2 is a schematic enlarged cross-sectional view of a structure in a region indicted by A of FIG. 1.

FIG. 2 is a schematic enlarged cross-sectional view of a structure in a region indicted by A of FIG. 1.

Referring to FIG. 2, the projecting part 12 of the rotating shaft 1 has a base material 50 constituting the heat input suppressing part and a hard coating film 51. The base material 50 is made of GFRP that is an example of FRP and the hard coating film 51 is made of a chromium carbide-based ($Cr_3C_2$-based) material. The hard coating film 51 is formed on an inner circumferential surface of the base material 50 by plasma thermal spraying. The hard coating film 51 includes the entire sliding surface of the projecting part 12 sliding on the supporting part 22. The film thickness of the hard coating film 51 is 50 [μm] or more and 300 [μm] or less. The film thickness of the hard coating film 51 is preferably 100 [μm] or more and 200 [μm] or less, and the hard coating film 51 can preferably employ the film thickness of 100 [μm], 150 [μm], or 200 [μm].

On the other hand, the supporting part 22 of the supply shaft 2 has a base material 55 constituting the heat input suppressing part and a hard coating film 56. The base material 55 is made of GFRP that is an example of FRP and the hard coating film 56 is made of a chromium carbide-based ($Cr_3C_2$-based) material. The hard coating film 56 is formed on an inner circumferential surface of the base material 50 by plasma thermal spraying. The hard coating film 56 includes the entire slid surface of the supporting part 22 sliding on the projecting part 12. The film thickness of the hard coating film 56 is 50 [μm] or more and 300 [μm] or less. The film thickness of the hard coating film 56 is preferably 100 [μm] or more and 200 [μm] or less, and the hard coating film 56 can preferably employ the film thickness of 100 [μm], 150 [μm], or 200 [μm].

In FIG. 2, a portion indicated by a thick line is a region in which the hard coating films 51, 56 are present. If the film thickness of the hard coating films is thinner than 50 [μm], the unevenness of the surface of the base material may affect the hard coating films and is highly likely to make it impossible to form a desired hard coating film. On the other hand, if the film thickness of the hard coating films is thicker than 300 [μm], the effect of contraction described later becomes larger and the hard coating films are more likely to peel.

An absolute value (hardness difference) acquired by subtracting the Vickers hardness of the hard coating film 56 of the supporting part 22 from the Vickers hardness [HV] of the hard coating film 51 of the projecting part 12 is 20 [HV] or more and 150 [HV] or less. By providing a hardness difference in this way between the two hard coating films 51, 56 sliding on each other, the fixation of the hard coating films 51, 56 to each other and the seizure of the hard coating films 51, 56 are suppressed. The hardness difference is more preferably 80 [HV] or more and 120 [HV] or less.

In this embodiment, the hard coating films 51, 56 are formed in partial regions including the entire sliding regions on the base materials 50, 55 made of GFRP. Therefore, axial end portions are generated in the hard coating films 51, 56. The present inventors obtained the following knowledge from studies. FRP including GFRP cannot be increased in temperature because of the heat-resisting property and, thereof, for example, the hard coating films are formed by causing melted metal to collide with FRP at normal temperature. As a result, the melted metal shrinks when adhering and hardening, and a force is applied in the direction of turning up of the hard coating films. Therefore, it is found that if the axial end portions of the hard coating films have a non-smooth portion due to a corner portion, the hard coating films easily peel.

Figure 3:
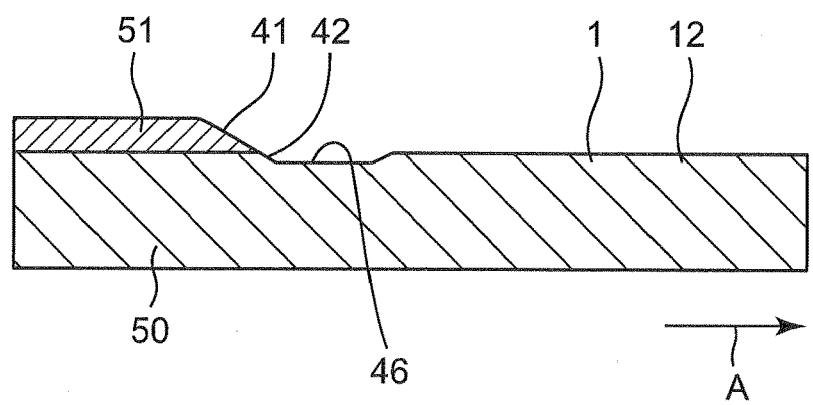
FIG. 3 is a schematic cross-sectional view when a periphery of an end portion on one side in an axial direction of a hard coating film is cut along a cutting plane including the normal direction and the axial direction of a surface of a base material.

FIG. 3 is a schematic of a structure employed in an axial end portion on one side in the axial direction of the hard coating film 51 of the projecting part 12 of the rotating shaft 1 and is a schematic cross-sectional view when a periphery of the end portion on one side in the axial direction of the hard coating film 51 is cut along a cutting plane including the normal direction and the axial direction of the surface of the base material 50.

In this embodiment, the end-portion structure is employed in all the four end portions of the two hard coating films 51, 56, i.e., the two end portions of the projecting part 12 of the rotating shaft 1 and the two end portions of the supporting part 22 of the supply shaft 2. The end-portion structures of the other three end portions will not be described since the end-portion structure of one end portion of the hard coating film 51 of the projecting part 12 will be described instead.

As shown in FIG. 3, an axial end surface 41 of the end portion of the hard coating film 51 is smoothly connected to a surface 42 of the base material 50. Specifically, as shown in FIG. 3, in a cross section along the cutting plane including the normal direction and the axial direction of the surface of the base material 50, the base material 50 and the hard coating film 51 are smoothly continuously connected at the boundary therebetween.

As shown in FIG. 3, the surface of the base material 50 has a recess 46. The axial end surface 41 of the end portion of the hard coating film 51 is smoothly continuously connected to a side surface of the recess 46 (this side surface is identical to the surface 42 of the base material 50; hereinafter, this side surface is also denoted by reference numeral 42).

The end surface 41 forms a slope. Specifically, the end surface 41 of the hard coating film 51 extends and shifts toward one side in the axial direction indicated by an arrow A of FIG. 3 as it comes closer to the base material 50. The side surface 42 of the recess 46 also forms a slope. The side surface 42 forming a slope extends in the extending direction substantially identical to the extending direction of the end surface 41 forming a slope. In other words, the side surface 42 and the end surface 41 are located on substantially the same slope.

The smooth continuous connection as described above refers to connection on, for example, a flat surface or a curved surface without a corner portion and is desirably refers to a connection relationship achieved when a tangent is drawn at the boundary, such that an angle between the boundary and the tangent is acute on the hard coating film side and is obtuse on the heat input suppressing part side.

Figure 4:
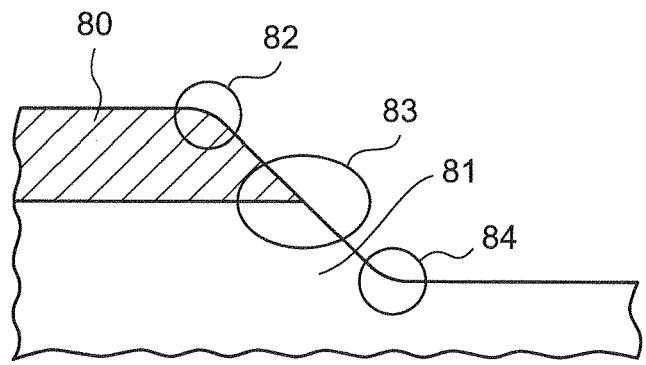
FIG. 4 is a schematic cross-sectional view of an example of smooth connection between the hard coating film and a heat input suppressing part.

Specifically, as shown in FIG. 4, i.e., a schematic cross-sectional view of an example of smooth connection between a hard coating film 80 and a heat input suppressing part 81, the smooth continuous connection is satisfied when the hard coating film 80 and the heat input suppressing part 81 are connected on a flat surface in a connection region (boundary region) 83.

Figure 5:
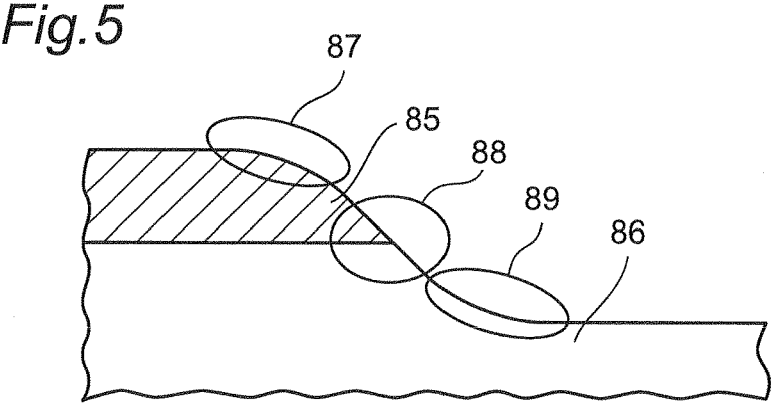
FIG. 5 is a schematic cross-sectional view of another example of smooth connection between the hard coating film and the heat input suppressing part.

Alternatively, as shown in FIG. 5, i.e., a schematic cross-sectional view of another example of smooth connection between a hard coating film 85 and a heat input suppressing part 86, the smooth continuous connection is satisfied also when the hard coating film 85 and the heat input suppressing part 86 are connected on a curved surface in a connection region (boundary region) 88.

Figure 6:
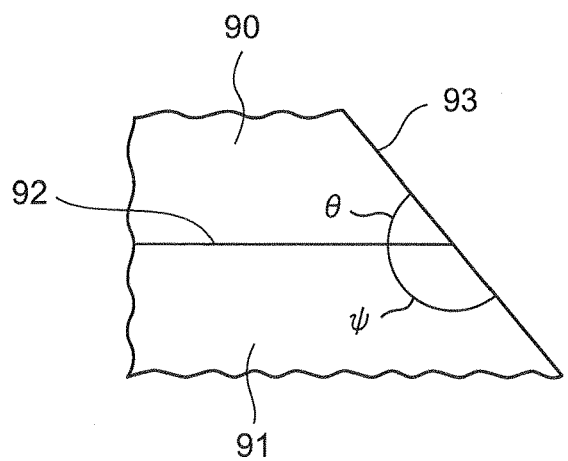
FIG. 6 is a schematic of a relationship of angle between a boundary and a tangent when the tangent is drawn at the boundary.

In the connection relationship, as shown in FIG. 6, i.e., a schematic of a relationship of angle between a boundary 92 and a tangent 93 when the tangent 93 is drawn at the boundary 92, the angle between the boundary 92 and the tangent 93 is preferably an acute angle θ on a hard coating film 90 side and an obtuse angle Ψ on a heat input suppressing part 91 side when the tangent 93 is drawn at the boundary 92. As indicated by reference numerals 82, 84 in FIG. 4 and reference numerals 87, 89 in FIG. 5, it is preferable that a corner portion be absent in extending-direction varying parts in the end portions in the axial direction of the hard coating films 80, 85 and extending-direction varying parts in the end portions of the heat input suppressing parts 81, 86 toward the hard coating films 80, 85 and that these variation parts be made up of curved surfaces with R.

In the configuration, the superconducting motor appropriately adjusts the currents flowing through the superconducting coil 7 and the normal coil 8 to appropriately generate a proper magnetic field with the superconducting coil 7 and the normal coil 8. A circumferential force based on a magnetic force is applied to the superconducting coil 7 to cause the superconducting coil 7 to rotate the fixed rotating shaft 1, and the rotational power of the rotating shaft is transmitted to the output shaft 3.

The present inventors conducted a so-called Ogoshi-type wear test to a plurality of materials having various hard coating films formed on surfaces of base materials made of GFRP.

Figure 7:
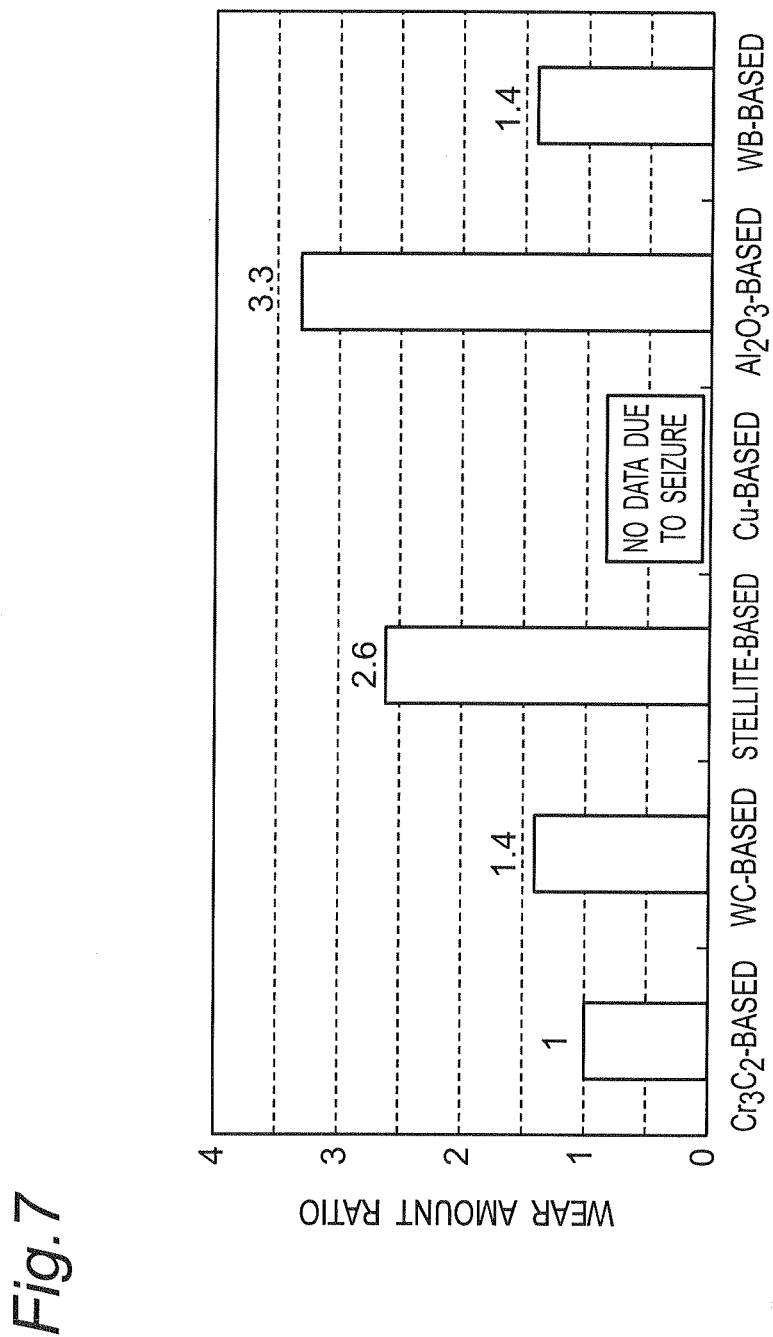
FIG. 7 is a diagram of a test result of an Ogoshi-type wear test of hard coating films.

FIG. 7 is a diagram of a test result thereof. In FIG. 7, wear amounts of hard coating films are represented by relative ratios when a wear amount of a $Cr_3C_2$-based hard coating film is defined as one.

As shown in FIG. 7, a test example shows that the material having the $Cr_3C_2$-based hard coating film formed on the surface of the base material made of GFRP is most hardly worn and is most excellent in wear resistance. According to a test example, materials having a WC-based (tungsten carbide-based) hard coating film formed thereon and a WB-based hard coating film formed thereon have good wear resistance. A material having a stellite-based hard coating film formed thereon and a material having an $Al_2O_3$-based hard coating film formed thereon have wear resistance falling short of the $Cr_3C_2$-based hard coating film and the WC-based hard coating film in a test example. However, the material having the stellite-based hard coating film formed thereon and the material having an $Al_2O_3$-based hard coating film formed thereon can acquire remarkably excellent wear resistance as compared to the case of the base materials made of GFRP constituting the sliding surface and the slid surface without formation of the hard coating films.

Although GFRP has a thermal conductivity of 0.5 to 0.7 [W/m·K] at normal temperature, a significantly low heat input amount per unit length at 300 [K] to 30 [K], and an extremely excellent thermal insulating property, wear due to mutual sliding of GFRP is of concern when GFRP is used in a slide mechanism. Specifically, the present inventors found that although a large contraction on the order of several mm occurs only about once a year in a maintenance interval in a large superconducting motor such as a three-MW class superconducting motor, since the rotor core rotates in a state of flexural deformation due to its own weight during normal operation, minute sliding (about 0.1 mm) always occurs in a sliding part in accordance with rotation of the motor. It is also found that fretting wear occurs when the sliding surface and the slid surface are made of GFRP. In a sliding mechanism of the superconducting motor of this embodiment, the hard coating films 51, 56 are formed on the surfaces of the base materials 50, 55. Therefore, although the base material of the sliding mechanism is made of GFRP and has the excellent thermal insulating property, the structure having a significantly reduced fretting wear amount and an excellent wear resistance can be achieved.

In literatures etc., it is described that in the case of thermal spraying to the metal to which HVOF (High Velocity Oxygen Fuel) thermal spraying can be used, a WC-based material is harder and more excellent in wear resistance than a $Cr_3C_2$-based material. However, as a result of extensive tests, the present inventors found that in the case of thermal spraying to FRP to which the plasma thermal spraying is usable only for thermal spraying of a first layer, the $Cr_3C_2$-based material is harder and more excellent in wear resistance than the WC-based material and further discovered that the $Cr_3C_2$-based material is more compatible with FRP and is more easily used for construction. Therefore, the thermal spraying to FRP produces a result opposite to a generally recognized result and a particularly remarkable effect can be produced by creating a hard coating film of a $Cr_3C_2$-based material.

Figure 8:
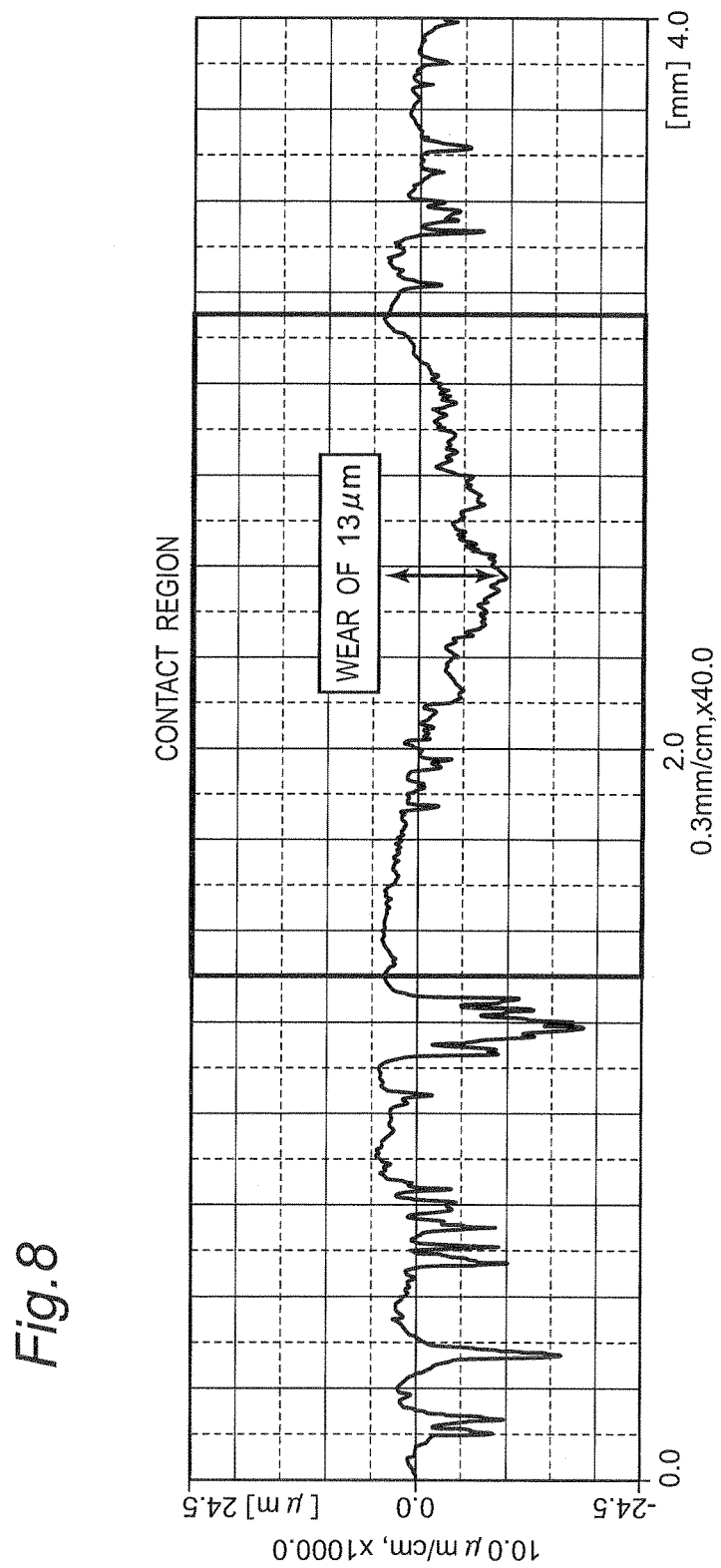
FIG. 8 is a diagram of a test result of examination of a wear depth of fretting wear.

FIG. 8 is a diagram of a test result of examination of a wear depth of fretting wear. This test was conducted by using a material having a $Cr_3C_2$-based hard coating film formed on GFRP. This test was conducted under the condition on the assumption of the sliding amount of 0.1 [mm], the contact surface pressure of 100 [MPa], and the cycle number of 3 [Hz]. In FIG. 8, the vertical axis indicates a wear depth in the normal direction of the sliding surface while the horizontal axis indicates a distance in one direction along the sliding surface, and a region surrounded by a frame in FIG. 8 represents a sliding region.

As shown in FIG. 8, in this wear test, the wear depth was at most 13 [μm]. In a result acquired from this test, although wear progresses in an initial period at the start of the test, the wear does not progress after this period.

According to the embodiment, since the base materials 50, 55 of the projecting part 12 and the supporting part 22 occupying a large portion of the heat input path of the sliding structure are each made of GFRP, the thermal conductivity can drastically be reduced by a factor of about ½₀ as compared to the conventional case of a supporting element made of metal (e.g., nickel alloy). In particular, the base materials 50, 55 act as the heat input suppressing parts suppressing thermal conduction. Therefore, the superconducting coil 7 can certainly be thermally-insulated from the outside and a periphery of the superconducting coil 7 can certainly be maintained at an extremely low temperature.

According to the embodiment, the sliding surface of the projecting part 12 and the slid surface of the supporting part 22 are respectively included in the hard coating films 51, 56 having the hardness higher than the glass fiber-reinforced plastic. Therefore, even if the projecting part 12 slides against the supporting part 22 while an excessive frictional force is generated based on larger thermal contraction or rotor core's own weight, the projecting part 12 and the supporting part 22 are hardly worn.

Although GFRP has an excellent thermal insulating property, plastic deformation of resin and exposure of fibers were observed in the wear test between GFRPs conducted by the present inventors. In the embodiment, while GFRPs are employed as the base materials 50, 55, the sliding surface (slid surface) is made up of the hard coating film 51, 56 so that the GFRPs do not slide on each other. Therefore, as compared to the conventional case, while the heat input amount of the sliding structure can drastically be reduced and the thermal insulating performance can drastically be improved, the sliding part can be made excellent in wear resistance.

According to the embodiment, since the axial end surfaces 41 of the hard coating films 51, 56 are smoothly continuously connected to the surfaces 42 of the base materials 50, 55, the force in the direction of turning up can be relaxed when the hard coating films 51, 56 shrink. Therefore, the end portions of the hard coating films 51, 56 can be restrained from peeling.

If a non-smooth corner portion exists between an end surface of a hard coating film and a surface of a base material, a large stress acts on the corner portion so that peeling easily occurs at the position thereof.

According to the embodiment, the end surfaces 41 of the hard coating films 51, 56 are connected to the side surfaces 42 on the other side in the axial direction of the recesses 46 of the base materials 50, 55, the end surfaces 41 of the hard coating films 51, 56 and the surfaces 42 of the base materials 50, 55 can more linearly be connected. Therefore, the possibility of occurrence of the peeling can further be suppressed.

According to the embodiment, since the hard coating films 51, 56 are formed by thermal spraying, the film thickness of the hard coating films 51, 56 and the dimensions of the formation regions of the hard coating films 51, 56 can more precisely be managed. Therefore, the wear resistance and the thermal insulating property of the hard coating films 51, 56 can be made more excellent. If the hard coating films are formed by plating etc. other than thermal spraying, thick film formation and grinding process become difficult.

Although the hard coating film 51, 56 having the sliding surface (slid surface) is a $Cr_3C_2$-based hard coating film in the embodiment, a hard coating film having a sliding surface (slid surface) may be a WC-based hard coating film, a Co-based hard coating film, or a Cu-based hard coating film. The hard coating film having a sliding surface (slid surface) may be an $Al_2O_3$-based hard coating film, a WB-based hard coating film, or a hard coating films made of DLC (diamond-like carbon). The hard coating film having a sliding surface (slid surface) may be made up by laminating two or more hard coating films out of a $Cr_3C_2$-based hard coating film, a WC-based hard coating film, a Co-based hard coating film, a Cu-based hard coating film, an $Al_2O_3$-based hard coating film, and a WB-based hard coating film. The hard coating films may be films of any material harder than FRP partially covered by the hard coating films.

Although the base materials 50, 55 are made of GFRP in the embodiment, the heat input suppressing parts may be made of glass long fiber-reinforced plastic, carbon fiber-reinforced plastic, boron fiber-reinforced plastic, aramid fiber-reinforced plastic, polyethylene fiber-reinforced plastic, xyron fiber-reinforced plastic, etc., or other fiber-reinforced plastics.

Although both the two hard coating films 51, 56 sliding on each other are $Cr_3C_2$-based hard coating films in the embodiment, for example, one of the two hard coating films sliding on each other may be $Cr_3C_2$-based hard coating film and the other film may be a hard coating film other than the $Cr_3C_2$-based hard coating film, such as a WC-based hard coating film. As described above, one hard coating film and the other hard coating film sliding on each other may be hard coating films of the same series or may be hard coating films different from each other in series. Regardless of whether the two hard coating films sliding on each other are hard coating films of the same series or hard coating films different from each other in series, it is preferable that a hardness difference (e.g., a hardness difference of 20 [HV] or more and 150 [HV] or less) exist in any case between one and the other of the two hard coating films sliding on each other. This is because if no hardness difference exists between one hard coating film and the other hard coating film sliding on each other, the hard coating films may fixedly adhere to each other.

In the embodiment, the hard coating film 51, 56 having the sliding surface (slid surface) is formed on the surface of the base material 50, 55, and the hard coating film 51, 56 is in direct contact with the base material 50, 55. However, the hard coating film having the sliding surface (slid surface) may be formed on a foundation film (this foundation film may not be a hard coating film) formed on the surface of the base material, and the hard coating film may be formed on the foundation film contacting with the surface of the base material. By forming the foundation film compatible with both the GFRP and the hard coating film, the GFRP and the hard coating film can consequently more strongly be coupled.

Although the torque tube 6 is separated from the rotating shaft 1 and is separated also from the output shaft 3 in the embodiment, the torque tube may integrated with the rotating shaft or may be integrated with the output shaft.

Although the output shaft 3 is indirectly fixed through the torque tube 6 to the rotating shaft 1 in the embodiment, the torque transmitting part may directly be fixed to the rotating shaft.

Although the warm damper 4 is separated from the supply shaft 2 and is separated also from the output shaft 3 in the embodiment, the warm damper may be integrated with the supply shaft and may be integrated with the output shaft. The supply shaft, the warm damper, and the output shaft may constitute an integrated structure.

Although the inner circumferential surface of the projecting part 12 of the rotating shaft 1 slides on the outer circumferential surface of the supporting part 22 of the supply shaft 2 acting as a one-end side shaft in the embodiment, the outer circumferential surface of the projecting part of the rotating shaft may slide on the inner circumferential surface of the supporting part of the one-end side shaft.

Although the supply shaft 2 is hollow and has the coolant passage allowing the coolant to flow inside the supply shaft 2 in the embodiment, any structure may be employed as long as the coolant can be supplied to the rotating shaft.

Although the rotating shaft 1 is slidably supported on the supply shaft 2 and the rotating shaft 1 is fixed to the output shaft 3 in the embodiment, the rotating shaft may slidably be supported on the output shaft and the rotating shaft may be fixed to the supply shaft.

Although the rotating shaft 1 has the projecting part 12 fastened to the body part 11 by the fastening member in the embodiment, the rotating shaft may have the projecting part integrated with the body part without including the fastening member. Similarly, although the supply shaft 2 has the supporting part 22 fastened to the body part 21 by the fastening member, the supply shaft may have the supporting part integrated with the body part without including the fastening member.

Although the hard coating films 51, 56 are applied by thermal spraying to the heat input suppressing part in the embodiment, at least one of the hard coating films may be applied by using a plating technique to the heat input suppressing part or the foundation film, or may be applied by a CVD method, a plasma CVD method, or a PVD method to the heat input suppressing part or the foundation film.

In the embodiment, the end surfaces 41 on both axial sides of the hard coating film 51 of the projecting part 12 and the end surfaces on both axial sides of the hard coating film 56 of the supporting part 22 are all smoothly continuously connected to the base materials 50, 55. However, out of the end surfaces on both axial sides of the hard coating film of the projecting part and the end surfaces on both axial sides of the hard coating film 56 of the supporting part, one or more and four or less end surfaces may be connected through a corner portion and may not smoothly continuously be connected to the heat input suppressing part.

In the embodiment, the portions of the base materials 50, 55 smoothly connected to the axial end surfaces of the hard coating films 51, 56 are the side surfaces 42 of the recesses 46 present on the surfaces of the base materials 50, 55. However, out of the four axial end surfaces of the hard coating films (the two end surfaces on both axial sides of the hard coating film of the projecting part and the two end surfaces on both axial sides of the hard coating film of the supporting part), one or more and four or less end surfaces may not be connected to the side surfaces of the recesses of the heat input suppressing parts and may be connected to portions other than the recesses of the heat input suppressing parts.

Figure 9:
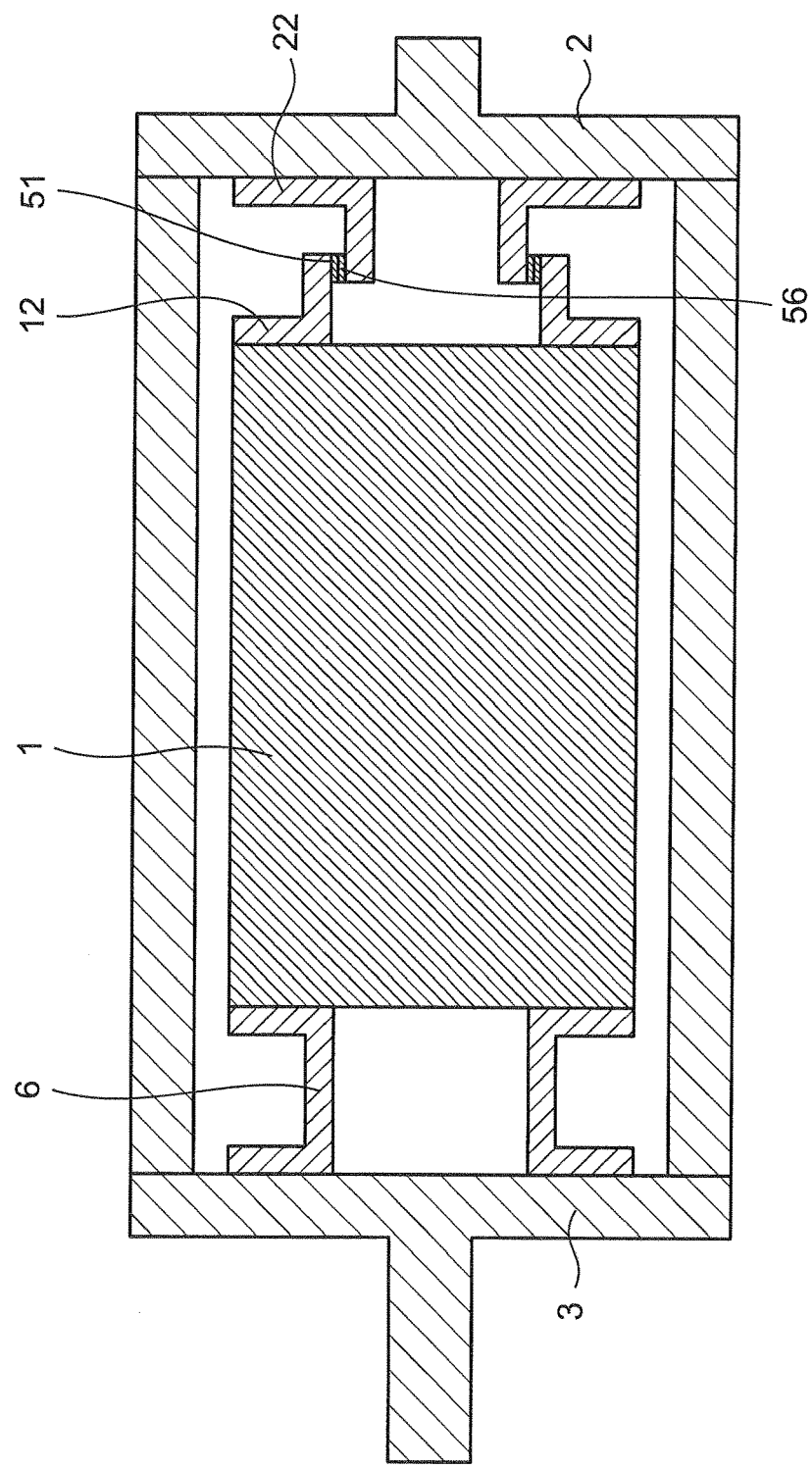
FIG. 9 is a simplified view of FIG. 1.

In the embodiment, as shown in FIG. 9, i.e., a simplified view of FIG. 1, the rotating shaft 1 has the projecting part 12 and the projecting part 12 has the sliding surface. Additionally, as shown in FIG. 9, the supply shaft 2 has the supporting part 22 constituting the rotating shaft supporting part and the supporting part 22 has the slid surface. However, the rotating shaft may not have the projecting part and the supply shaft may not have the rotating shaft supporting part.

Figure 10:
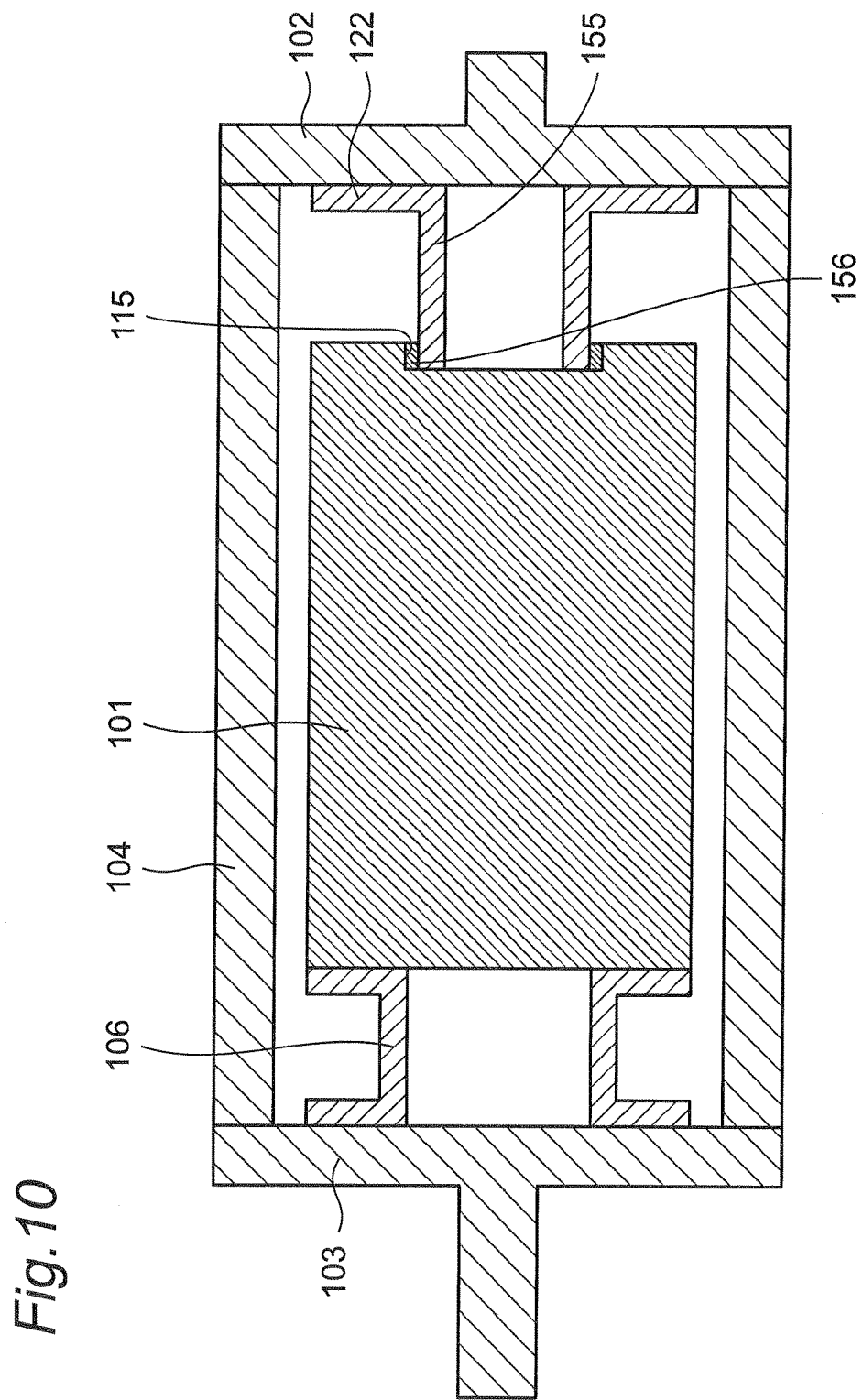
FIG. 10 is a simplified view of a modification example, corresponding to FIG. 9.

Specifically, as shown in FIG. 10, i.e., a simplified view of a modification example, the rotating shaft 101 may not have the projecting part and may have an inner circumferential surface 115 in an end portion on one side in the axial direction. A sliding surface on the inner circumferential surface 115 of the rotating shaft 101 may be brought into axially slidable contact with a slid surface on a hard coating film 156 of an axially projecting supporting part 122 of the supply shaft 102. Although not shown, the configuration may be inverted from FIG. 10, i.e., the supply shaft may not have the axially projecting supporting part and may have an inner circumferential surface in an end portion on the other side in the axial direction. A sliding surface on the hard coating film on the projecting part of the rotating shaft may be brought into axially slidable contact with the inner circumferential surface of the supply shaft. In FIG. 10, reference numerals 103, 104, and 106 denote an output shaft, a warm damper, and a torque tube, respectively. Reference numeral 155 denotes a base material made of FRP constituting a heat input suppressing part in the supporting part 122.

Figure 11:
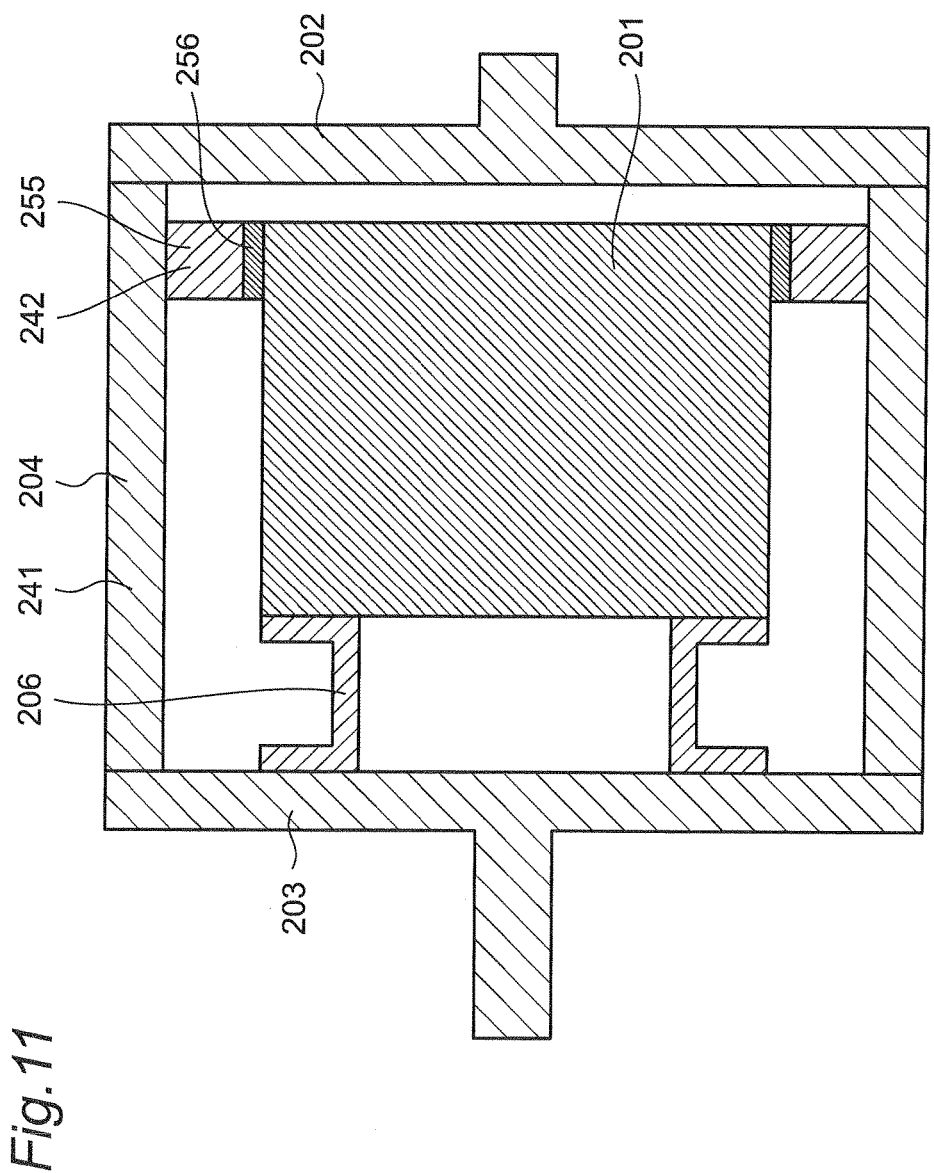
FIG. 11 is a simplified view of another modification example, corresponding to FIG. 9.

As shown in FIG. 11, i.e., a simplified view of another modification example, a warm damper 204 may have a cylindrical body part 241 and a supporting part 242 constituting a rotating shaft supporting part, and the supporting part 242 may be configured to extend radially inward from an inner circumferential surface of the body part 241. A sliding surface on an outer circumferential surface of a rotating shaft 201 may be brought into axially slidable contact with a slid surface on a hard coating film 256 of a supporting part 242. In FIG. 11, reference numerals 203 and 206 denote an output shaft and a torque tube, respectively. Reference numeral 255 denotes a base material made of FRP constituting a heat input suppressing part in the supporting part 242.

Figure 12:
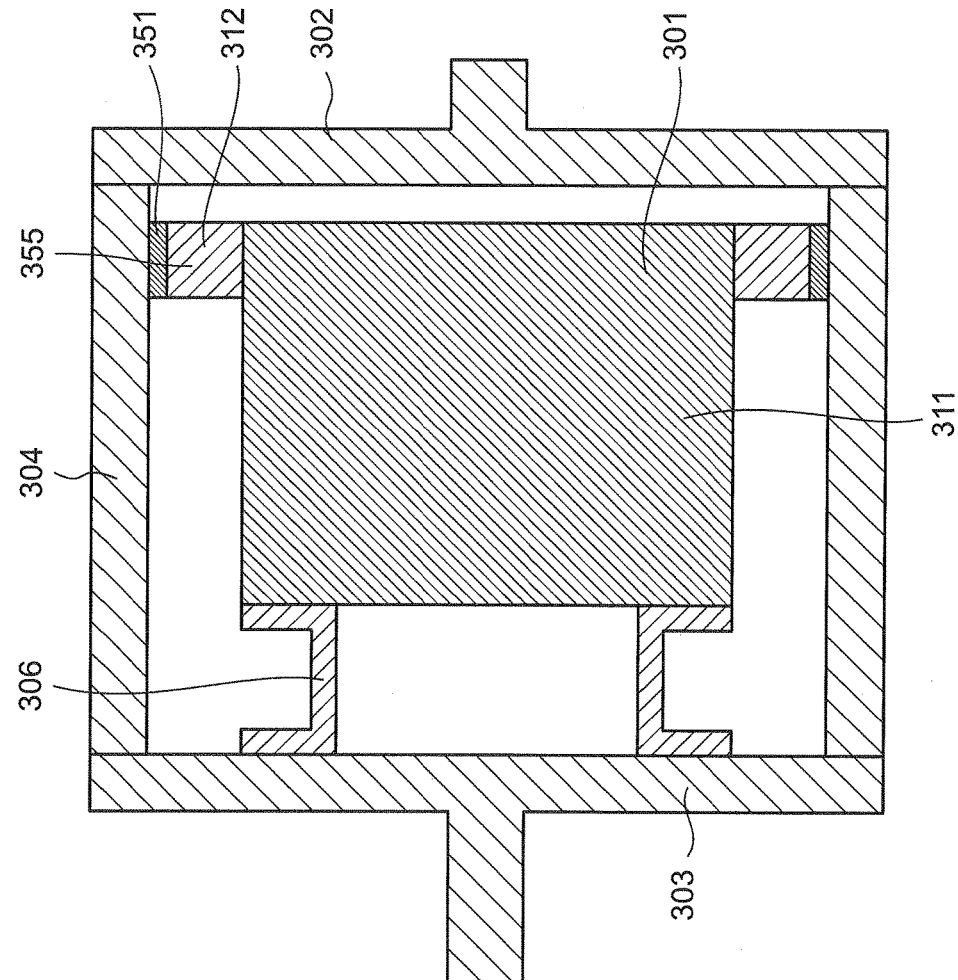
FIG. 12 is a simplified view of a further modification example, corresponding to FIG. 9.

As shown in FIG. 12, i.e., a simplified view of a further modification example, a rotating shaft 301 may have a body part 311 having an outer circumferential surface and an annular projecting part 312, and the projecting part 312 may be configured to extend radially outward from the outer circumferential surface of the body part 311. A sliding surface on a hard coating film 351 of the projecting part 312 is brought into axially slidable contact with a slid surface on an inner circumferential surface of the warm damper 304. In this case, a rotating-part supporting part is made up of a portion of the inner circumferential surface of the warm damper 304 radially overlapping with the projecting part 312 on one side in the axial direction. In FIG. 12, reference numerals 303 and 306 denote an output shaft and a torque tube, respectively. Reference numeral 355 denotes a base material made of FRP constituting a heat input suppressing part in the projecting part 312. FIGS. 9 to 12 are simplified views and the hard coating films 51, 56, 156, 256, 351 are exaggeratedly drawn in FIGS. 9 to 12.

With regard to the sliding surface of the rotating shaft 101 without a heat input suppressing part in the modification example shown in FIG. 10, the sliding surface of the rotating shaft 201 without a heat input suppressing part in the modification example shown in FIG. 11, and the slid surface warm damper 304 without a heat input suppressing part in the modification example shown in FIG. 12, none of the surfaces may be present on the hard coating films. Alternatively, out of the sliding surface of the rotating shaft 101 without a heat input suppressing part in the modification example shown in FIG. 10, the sliding surface of the rotating shaft 201 without a heat input suppressing part in the modification example shown in FIG. 11, and the slid surface warm damper 304 without a heat input suppressing part in the modification example shown in FIG. 12, one or more surfaces may be present on the hard coating films.

If one side constituting the sliding structure has a heat input suppressing part made of FRP while the other side constituting the sliding structure does not have a heat input suppressing part made of FRP, the other side does not need to have the hard coating film. However, if a combination unsuitable for the sliding part is made such as when the other side is significantly soft as compared to the one side and when the one side and the other side are made of the same type of material, the hard coating film is desirably formed also on the other side. This is because in such a case, forming the hard coating film on the other side can suppress significant wear on the other side of the sliding part and adhesion of the one side and the other side.

In the embodiment, the end surface on one side in the axial direction of the output shaft 3 constituting the torque transmitting part is fixed to the end surface on the other side in the axial direction of the rotating shaft 1 so as to fix the torque transmitting part to the other side in the axial direction of the rotating shaft. However, a portion located on the other side in the axial direction in the warm damper constituting the torque transmitting part may be fixed to a portion located on the other side in the axial direction in the outer circumferential surface of the rotating shaft.

The rotating shaft supporting part may be present on one side in the axial direction relative to the center position in the axial direction of the rotating shaft, and the torque transmitting part may be present on the other side in the axial direction relative to the center position in the axial direction of the rotating shaft. As long as a structure is achieved such that thermal contraction can be released through a slide (the sliding part) on the one side in the axial direction relative to the center position in the axial direction of the rotating shaft while a torque can be transmitted on the other side in the axial direction relative to the center position in the axial direction of the rotating shaft, the rotating shaft may be fixed to the torque transmitting part in any manner and the rotating shaft may slidably be supported by the rotating shaft supporting part in any manner.

The superconducting rotating machine of the present invention may be applied to any superconducting rotating machine capable of employing a sliding structure and, for example, the machine may employ either a configuration of continuously supplying a voltage and a current from the outside of the superconducting coil or a configuration without the continuous supply of a voltage and a current from the outside of the superconducting coil while a field winding is in a so-called persistent current mode. Although the normal coil 8 is disposed outside the warm damper 4 in the embodiment, a permanent magnet may be disposed outside the warm damper instead of the normal coil. As described above, any modifications apparent to those skilled in the art may be applied to the embodiment.

Although the superconducting rotating machine is a superconducting motor in the embodiment, the superconducting rotating machine of the present invention may be an electric generator. In this case, the output shaft denoted by reference numeral 3 in FIG. 1 acts as an input shaft in a field rotor. The sliding surface only needs to be axially slidable against the slid surface, and the sliding surface may be circumferentially slidable against the slid surface or the sliding surface may not be circumferentially slidable against the slid surface. The use application of the present invention is not limited to a propulsion apparatus of a large ship and the superconducting rotating machine of the present invention may have any size. Obviously, two or more configurations out of the configurations described in the embodiment and modification examples can be combined to construct a new embodiment.

Arbitrary embodiments can be combined as needed out of the various embodiments to produce the respective effects thereof.

Although the present invention has been sufficiently described in terms of preferable embodiments with reference to the accompanying drawings, various modifications and corrections are apparent to those skilled in the art. It should be understood that such modifications and corrections are included in the present invention without departing from the scope of the present invention according to the accompanying claims.

EXPLANATIONS OF REFERENCE OR NUMERALS 1, 101, 201, 301 rotating shaft
2, 102 supply shaft
3, 103, 203, 303 output shaft
4, 104, 204, 304 warm damper
7 superconducting coil
41 end surface on one side in axial direction of hard coating film of projecting part
42 side surface of recess of base material
46 recess of base material
50 base material of projecting part
51 hard coating film of projecting part
55 base material of supporting part
56 hard coating film of supporting part
80, 85, 90 hard coating film
81, 86, 91 heat input suppressing part
115 inner circumferential surface of rotating shaft 155 base material of supply shaft
156 hard coating film of supply shaft
255 base material of warm damper
256 hard coating film of warm damper
351 hard coating film of rotating shaft
355 base material of rotating shaft

The invention claimed is:

1. A superconducting rotating machine comprising:
a rotating shaft having an annular sliding surface on one side in an axial direction;
a torque transmitting part fixed to the other side in the axial direction of the rotating shaft;
a rotating shaft supporting part having an annular slid surface configured to slide in the axial direction on the sliding surface and the rotating shaft supporting part being configured to support the rotating shaft while being movable in the axial direction with respect to the rotating shaft; and
a superconducting coil held by the rotating shaft and cooled by a coolant supplied from one end side of the rotating shaft in the axial direction of the rotating shaft, wherein:
at least one of the sliding surface and the slid surface being present on a surface of a hard coating film located to partially cover a heat input suppressing part made of a fiber-reinforced plastic;
the hard coating film being harder than the heat input suppressing part;
an end surface on one side in the axial direction of the hard coating film is smoothly connected to a surface of the heat input suppressing part;
a surface of the heat input suppressing part has a recess; and
the end surface on the one side of the hard coating film is smoothly connected to a side surface in an axial direction of the recess.

2. The superconducting rotating machine according to claim 1, wherein the hard coating film is formed by thermal spraying.

3. A superconducting rotating machine comprising:
a rotating shaft having an annular sliding surface on one side of the rotating shaft in an axial direction;
a torque transmitting part fixed to the other side in the axial direction of the rotating shaft;
a rotating shaft supporting part having an annular slid surface configured to slide in the axial direction on the sliding surface and the rotating shaft supporting part being configured to support the rotating shaft while being movable in the axial direction with respect to the rotating shaft; and
a superconducting coil held by the rotating shaft and cooled by a coolant supplied from one end side of the rotating shaft in the axial direction of the rotating shaft, wherein:
at least one of the sliding surface and the slid surface being present on a surface of a hard coating film located to partially cover a heat input suppressing part made of a fiber-reinforced plastic;
the hard coating film is harder than the heat input suppressing part; and
when a tangent is drawn at a boundary of the hard coating film and the heat input suppressing part, an angle between the boundary and a tangent is an acute angle on a hard coating film side and an obtuse angle on a heat input suppressing part side.

4. The superconducting rotating machine according to claim 3, wherein the tangent is drawn along a connection region being a curved surface extending along an edge of the hard coating film and the heat input suppressing part.

* * * * *